May 31, 1949.  R. E. WEISS  2,471,990

DEVICE FOR BEATING TIME IN TEACHING MUSIC

Filed March 23, 1945

Inventor
Ralph E. Weiss
By John S. Powers
Attorney

Patented May 31, 1949

2,471,990

UNITED STATES PATENT OFFICE 2,471,990

DEVICE FOR BEATING TIME IN TEACHING MUSIC

Ralph E. Weiss, Cheektowaga, N. Y.

Application March 23, 1945, Serial No. 584,367

2 Claims. (Cl. 84—484)

My invention relates to devices to be used in the teaching of music and, more particularly, for effecting the observance of correct timing in its rendition.

As is well known, the proper playing of any musical selection demands strict adherence to timing. It is important that the timing of the beats and the intervals between the beats be carefully observed and followed. This is difficult, if not impossible, for beginners and even for many more experienced music students.

Various methods have been employed in attempting to maintain the prescribed timing. The simplest and most generally used aid is beating time with the foot.

Mechanical time-beating devices, such as the well known metronome pendulum device, have long been employed for the teaching of proper timing, but such devices are not adaptable to changes in timing without manual adjustment, which is inconvenient and renders quick changes in tempo impossible. Moreover, the aid derived from a pendulum device depends upon close observance of its movement by the perfomer or still closer attention to the sound of its operation, if it is so constructed and positioned as to be audible.

Since a pupil learning to play a piece of music must generally devote his entire ocular attention to the score of the selection he is playing, it is impossible for him to follow the movements of a pendulum device.

Dependence upon an audible time-aid is equally impracticable and ineffective, for the reason that the sound of the instrument the pupil is playing, for example, a violin, horn, harmonica or drum, either makes it impossible for him to hear the audible time-beating device or so distracts his attention, through his efforts to hear it, that the musical performance may be interrupted or otherwise ruined by subordination of everything else to the maintenance of proper timing.

Because of these and other objections the use of a metronome or other visual or audible time-beating devices has been or naturally will in many cases be discarded in favor of the original foot-beat. Beating time with the foot is natural, instinctive and easy; it permits the performer to devote his entire time and attention to the instrument and the music.

In teaching elementary music the teacher commonly beats the time with his foot and the pupil follows him, as well as he can, with his own foot.

Cooperation of the teacher and pupil in the matter of timing is essential. However, it is not always possible or easy for the pupil to detect the teacher's time-beat. There is a tendency to overlook it, even when it can be heard. Operation of an audible time-beater by the teacher's foot is open to the same objections as the audible pendulum device. Moreover, however loud the sound may be, the pupil, as he becomes familiar with the piece, is apt to forget or disregard the teacher's foot-beat and accelerate the time; or he may encounter difficulties or lose interest and unconsciously drag in his time. Either way the rendition will be ruined.

To be effective, useful and practical, any means for creating or promoting the necessary cooperation of pupil and teacher in timing must be direct and positive in action and convenient for both pupil and teacher. It must also be capable, when in use, of effecting ready and certain control by the teacher of the foot-beat of the pupil.

With these objects and circumstances in view I have devised a foot-operated time-beating device which is simple in construction and economical to manufacture, but which is designed and adapted for use conjointly by teacher and pupil to enable the beating of time by the pupil to be constantly under the direction and control of the teacher.

The invention broadly contemplates the assemblage in operatively connected relation of pedals or treadles, one for operation by the pupil and the other by the teacher. The connected pedals or treadles may be disposed side by side, but are preferably arranged end to end in interengageable relation. In any form of embodiment of the invention the movement of one pedal or treadle is opposed to that of the other.

As thus indicated, the invention may have several specifically different forms of concrete embodiment. In the drawings.

Figure 1:
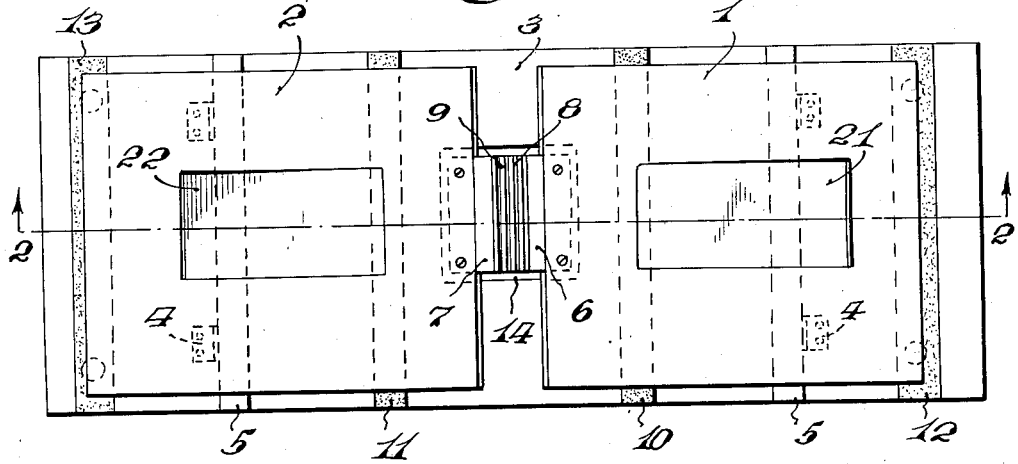
Figure 1 is a top plan view of my preferred form of embodiment of the invention.

In its preferred form my invention broadly comprises opposed treadles or pedals 1, 2, pivotally mounted in adjacent relation on a suitable support, which may be either a floor or, preferably, a portable base 3. Pedals 1, 2, of wood, metal, composition or other suitable material, may be arranged side by side, but are preferably placed in end to end relation. The pivotal mounting of pedals 1, 2, may be of any suitable form, such as the hinge connection 4 to an upstanding rib or other projection 5.

Where the pedals are arranged side by side suitable gear connections are provided for their conjoint operation in synchronous opposed relation. Where the pedals 1, 2, are in end to end arrangement, as illustrated, the opposing ends of pedals 1, 2, are provided with gear elements so formed and positioned as to intermesh. These gear elements are preferably enlarged and in the form of segments 6, 7, the arcuate meeting faces of which are shaped or provided with interengageable teeth or projections 8, 9, to form intermeshing gear segments. The segments 6, 7, may be cut or molded integrally with the pedals 1, 2, respectively, or may be formed by securing to the pedals 1, 2, by screws 16, 17, or other suitable means, supplemental blocks 20, 21. The gear segments 6, 7, may be confined to a restricted substantially middle zone at the opposed ends of the pedals 1, 2, as shown in Fig. 1, but may be relatively narrower or wider than indicated in Fig. 1, and may even be coextensive with the pedal ends, if desired.

Stops 10, 11 for the forward portions of the respective pedals 1, 2, and other stops 12, 13, for the rear or heel portions may be provided and may be made of rubber or other suitable, preferably resilient, material.

Figure 2:
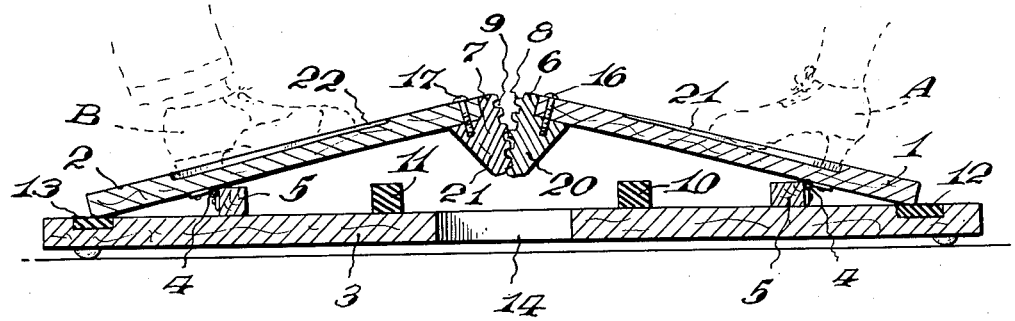
Figure 2 is a vertical sectional view of the device shown in Fig. 1, taken on line 2—2 of Fig. 1.

When the meeting ends of pedals 1, 2, are of the configuration and dimensions shown in Figs. 1 and 2, a well 14 of suitable dimensions is provided in base 3 to receive the gear segments 6, 7, in their lowermost position. With other forms of gear segments, projecting a shorter distance, or not at all, below the plane of the under surfaces of the pedals 1, 2, the well may be dispensed with.

Figure 3:
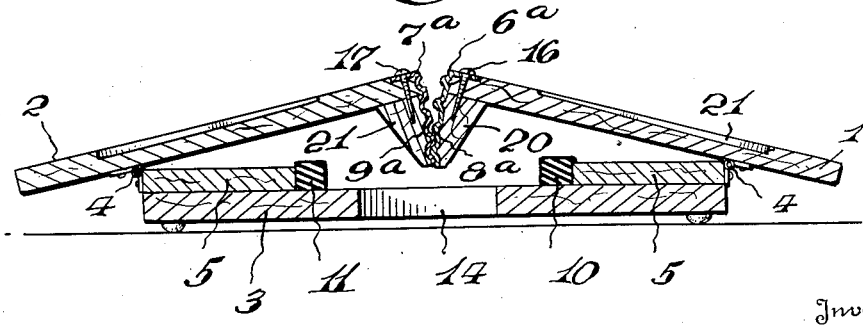
Figure 3 is a view similar to Fig. 2 of the device illustrated in Figs. 1 and 2, with a modified form of base and a modified form of connection between the pedals or treadles.

Also, with the shortening of the base 3 and the mounting of the pedals 1, 2, in the manner shown in Fig. 3, the stops 12, 13 may be omitted as unnecessary.

The gear teeth or projections 8, 9, in the form of construction illustrated in Fig. 2, are cut or molded in the respective faces of gear segments 6, 7.

In the modified form of construction shown in Fig. 3 the gear segments 6a, 7a, may be of metal or other suitable material, each cast or molded in a single piece and secured, by screws 16, 17, or other suitable means, to ordinary straight square-ended board pedals 1, 2, and segmental blocks 20, 21. The gear segments, although preferably formed with integral gears cut out of wooden blocks or cast or molded of metal and of identical form, as shown in Fig. 2, may comprise separate mating gear strips, as in the modified form of construction illustrated in Fig. 3.

The gear elements, in Fig. 3, are in the form of gear plates or strips 6a, 7a, one of which may have the gear teeth on its arcuate face formed by rounded rivets or studs set therein and projecting therefrom, the other being a complementary plate or strip formed in any suitable manner with sockets or depressions of such size and position as to receive the rivets or studs of the opposed element in proper slidable relation.

Preferably, however, the gear teeth 8a, 9a, are complementary projections and depressions formed in metal or composition plates or strips 6a, 7a, respectively, which operation may be performed easily and economically by a punch press.

For convenience, each of the pedals 1, 2, may be provided with a depression in its face which may be of such size and shape as to receive the foot of the pupil or teacher. By way of example, a foot A of a pupil is indicated in Fig. 2 as positioned in depression 21 and a foot B of the teacher in depression 22, but the relative positions of feet A and B may be reversed, as desired.

In operation, both the pupil and the teacher beat time, the former with his foot A on pedal 1 and the latter with his foot B on pedal 2. By reason of their connection, pedals 1, 2, must move synchronously; consequently, the pupil's foot-beat, represented by movement of pedal 1, is positively controlled by the teacher's pedal 2 at all times.

I claim:

1. A device for teaching music comprising companion pedals arranged in end-to-end relation and each of which is mounted for rocking movement, one of said pedals being adapted to be engaged and operated by a foot of a teacher for beating the proper time and the other of which is adapted to be engaged and operated by a foot of a pupil being instructed by the teacher, and means operatively connecting said pedals so that a rocking movement of one will cause a corresponding and simultaneous rocking movement of the other in the same direction, whereby the teacher, by controlling the rate of operation of one pedal, may influence the pupil to operate the other pedal at a rate corresponding to the proper time.

2. A device for teaching music comprising companion pedals arranged in end-to-end relation and each of which is mounted for rocking movement, one of said pedals being adapted to be engaged and operated by a foot of a teacher for beating the proper time and the other of which is adapted to be engaged and operated by a foot of a pupil being instructed by the teacher, and means connecting the adjacent ends of said pedals so that a rocking movement of one will cause a corresponding and simultaneous movement of the other in the same direction, whereby the teacher, by controlling the rate of operation of one pedal, may influence the pupil to operate the other pedal at a rate corresponding to the proper time.

RALPH E. WEISS.

REFERENCES CITED

The following references are of record in the file of this patent:

UNITED STATES PATENTS

| Number | Name | Date |
|---|---|---|
| 335,201 | Jeffery | Feb. 2, 1886 |
| 1,783,537 | Goudsmit | Dec. 2, 1930 |
| 2,166,978 | Stack | July 25, 1939 |
| 2,223,668 | Nicola | Dec. 3, 1940 |